Nov. 10, 1959     G. G. KELLEY     2,912,577

MULTICHANNEL ANALYZER

Filed Dec. 7, 1954     5 Sheets-Sheet 1

INVENTOR.

BY George G. Kelley

ATTORNEY

INVENTOR.
George G. Kelley
ATTORNEY

INVENTOR.
BY George G. Kelley
ATTORNEY

United States Patent Office 2,912,577
Patented Nov. 10, 1959

2,912,577

MULTICHANNEL ANALYZER

George G. Kelley, Kingston, Tenn., assignor to the United States of America as represented by the United States Atomic Energy Commission Application December 7, 1954, Serial No. 473,766

4 Claims. (Cl. 250—27)

The present invention relates to pulse amplitude analyzers, and more especially to a novel method of and improved means for sorting electrical impulses into groups according to their respective amplitudes and counting the pulses in each group.

A great many natural phenomena may be studied by converting a series of events into a corresponding group of electrical pulses of varying amplitudes, the amplitudes depending upon the magnitude of a certain variable of the event. For example, in the study of radioactive decay, emission of radiations, occurring randomly in time, may be converted to a series of pulses by a detector element, and useful information regarding the decay scheme of the radioactive source may be derived by analyzing the pulse spectrum to determine the number of pulses having amplitudes falling within each of a number of "channels" bounded by certain discrete limits.

The essential elements of one type of electrical pulse amplitude analyzer may be generally enumerated as follows: first, a linear amplifier is required to increase the amplitude of the signals to be studied proportionally to their original magnitudes. Second, means may be provided to determine that the peak amplitude of the signal has been reached. Third, elements of the analyzer may decide what peak amplitude has been reached by each pulse. Fourth, the amplitude decision elements may be interrogated between pulses to determine which decision element was actuated. During this interrogation period, protection should be provided both against occurrence of another pulse which might actuate another amplitude decision element and also against pulse pileup, which causes the input pulse to be too large and therefore to actuate the wrong decision element. Fifth, means may be provided to store the information obtained during interrogation. Sixth, read-out or indicator means may be associated with the storage so that the stored information may be recovered at any desired time.

One difficulty with pulse analyzers of the prior art was that they did not entirely satisfactorily examine the entire pulse spectrum at one time. Some were far too slow for general use. Some fast analyzers, such as the 20-channel analyzer described in the Bell et al. U.S. Patent 2,775,698, issued December 25, 1956, were so costly that in operation the entire pulse spectrum is divided into 120 channels, and inspected 20 channels at a time, so that roughly ⅙ of the spectrum is covered at one time. It was not economically feasible to construct and operate six such analyzers to inspect the entire spectrum at one time, while preserving the desired narrow amplitude increments of the channels, because of the large cost involved. However, applicant, with the knowledge of the complex problems associated with the design of prior pulse amplitude analyzers, has invented an improved analyzer which can be constructed at a reasonable cost, yet which will satisfactorily analyze the entire pulse spectrum at once. In a preferred embodiment of this invention, the spectrum is divided into 120 simultaneously inspected channels, which are sub-divided into three groups of 40 channels each, each group being provided with its own window amplifier, but all groups using the same pulse-lengthener and interrogation circuitry.

Another difficulty associated with instruments of the prior art has been the erroneous indication received when one pulse is followed too closely by a second pulse. In such cases, the second pulse arrives during interrogation, and a pulse may be recorded in one or more channels falsely, the channels having no fixed relation to the true amplitude. Moreover, if several pulses occur very close together in time, the prior instruments might respond as though only one exceedingly long piled-up pulse had occurred. In both cases, there are two errors: the information in the individual pulses is lost, and false pulses are recorded. Accordingly, applicant has devised a new and novel method for refusing electronic signals resulting from pileup of a group of pulses and disregarding information from pulses followed too closely in time by a second pulse, so that no false information is accepted.

A third shortcoming of analyzers of the prior art was the difficulty in circuit design and construction associated with the amplitude-selective "window" amplifiers and the pulse lengtheners, as shown in Fig. 2 of the Bell et al. patent, supra. The latter had to be designed to handle the large signal voltages which must be coupled to the discriminators from the window amplifiers, while the former had to be very fast to operate on the short, differentiated signal pulses and to recover swiftly to be ready for the next incoming pulse. Applicant has invented a novel fast pulse lengthener circuit which is able to operate on the small signals from the linear amplifiers without further amplification and to sustain correctly the crest of the voltage of the incoming signals. With this circuit, the window amplifier may be slower because it can now be connected to the output of the lengthener, where it can operate on the substained pulse, rather than on the sharp "spike."

With the knowledge of these and various other problems related to pulse amplitude analyzers of the prior art, applicant has as a primary object of his invention provision of an improved multi-channel pulse analyzer for sorting and counting a series of pulses of varying amplitudes.

Another object of his invention is to provide a multi-channel pulse analyzer having improved circuit design such that it may satisfactorily analyze an entire pulse spectrum at one time, at reasonable cost.

Another object of his invention is to provide a novel pulse lengthener circuit for a pulse analyzer.

Still another object of his invention is to provide a new and novel pulse analyzer including an electronic circuit which will inspect each pulse received and pass or reject the pulse depending upon its duration and upon the time interval before the next succeeding pulse is received.

These and other important advantages of applicant's novel pulse amplitude analyzer will become apparent from the following detailed description of a preferred embodiment thereof, when read in conjunction with the appended drawings, in which.

Figure 1:
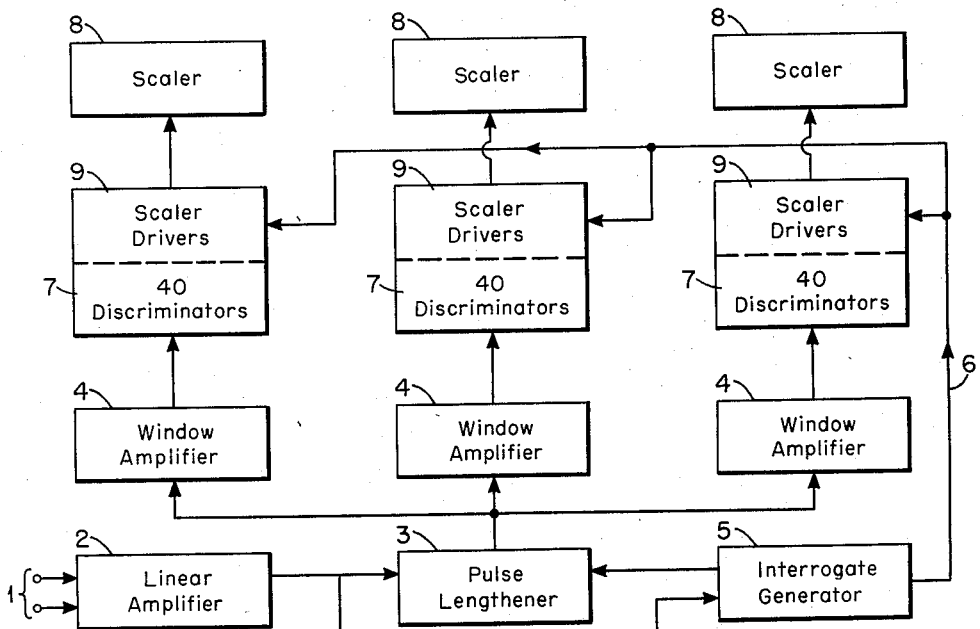
Figure 1 is a block diagram of applicant's improved multi-channel analyzer.

Referring now to Figure 1, electrical pulses to be analyzed are applied serially to input 1 of linear amplifier 2. Each pulse is proportionately amplified, twice differentiated, and then applied to pulse lengthener 3, where the crest of the maximum amplitude is sustained, and the sustained pulse wave form is then passed to window amplifiers 4. The output pulse, derived from amplifier 2 is also applied to pulse height selector (PHS) 10, producing a control pulse of constant amplitude and of duration proportional to that of the input pulse. This control pulse is fed to interrogate generator 5, where it is stored temporarily. If another control pulse is not received from the PHS circuit within a selected time interval $T_1$, and if the control pulse does not exceed a selected duration $T_2$, generator 5 will deliver an enabling pulse along interrogate bus 6 to each scaler driver 9 associated with discriminators 7. Signal pulses, lengthened and further amplified through the appropriate window amplifiers, will enter the discriminators 7. Each discriminator channel is biased to a different voltage acceptance level, and only that channel biased to correspond with the amplitude of the pulse received operates, as described hereinafter. Each channel has associated therewith a scaler driver 9 and a scaler 8 for counting the pulses received in that channel on the scaler register.

The linear amplifier 2 should amplify the pulses received so that the amplitudes of the output pulses bears a constant proportional relationship to the amplitudes of the input pulses. Double differentiation of the input pulses should be accomplished, so that output pulse duration is proportional to that of the corresponding input pulse. One suitable double-differentiating linear amplifier is described and a circuit diagram is illustrated in report ORNL-1620, p. 48, available from the Superintendent of Documents, Washington, D.C. Other linear amplifiers provided with double differentiation may be utilized in the analyzer, specific design details of the amplifier forming no part of the present invention. Similarly the specific circuit designs of the pulse height selector 10, scalers 8, discriminators 7, and scaler drivers 9 are not claimed as applicant's invention, but these circuit building blocks are illustrated to show a complete analyzer according to applicant's invention.

Figure 2:
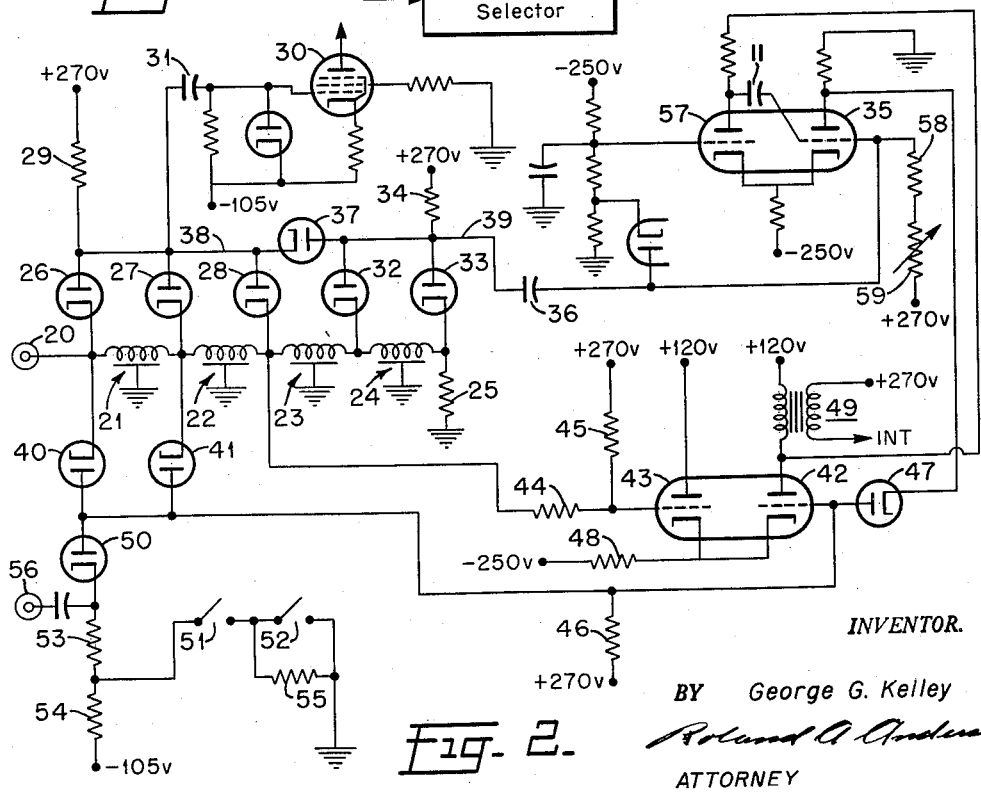
Figure 2 illustrates a novel interrogate-pulse generator incorporated in the novel analyzer.

Referring now to Figure 2, the interrogate-generator receives a negative pulse of essentially 10 volts amplitude from the linear amplifier at input 20, which is connected to a 4-section delay line of substantially 1,000 ohms impedance. Section 21 has a delay of .6 microsecond, section 22 has a delay of .6 microsecond, and sections 23, 24 have delays of .5 microsecond each, the line being terminated by 1,000 ohm resistor 25. The first, second, and third taps on the delay lines are coupled through diodes 26, 27, and 28 to a bus 38, so that the diodes normally draw current equally through resistor 29. The grid of pulse lentghener current tube 30 is coupled to bus 38 through a condenser 31 to maintain the tube cut off as long as the pulse is on the bus. The fourth and fifth taps on the delay line are coupled through diodes 32, 33 to bus 39, the diodes normally conducting equally through resistor 34. Bus 39 is coupled to the grid of timing multivibrator tube 35 through condenser 36, and to bus 38 through diode 37. Thus it is apparent that after a signal is received at input 20, a corresponding pulse will appear on bus 38 until section 22 is traversed 1.2 microseconds after the end of the pulse, while a pulse will appear on bus 39 until section 24 is traversed, that is, from the start of the signal until 2.2 microseconds after the end of the signal.

Diodes 40, 41 couple the first and second delay line taps to the grid of tube 42, which together with tube 43 forms a "long-tailed pair" circuit. The diodes normally conduct through resistor 46. The control grid of tube 43 is coupled through resistor 44 to the third tap on the delay line and through resistor 45 to a source of bias voltage. Normally tube 43 will conduct because of the positive bias of about 5 volts developed across resistor 44, thus drawing all the cathode current through resistor 48 and cutting off tube 42. In order for tube 42 to conduct, the negative pulse from the delay line must be impressed upon tube 43 but not on tube 42. When such event occurs, current begins to flow through tube 42 and transformer 49. The trailing edge of the delayed pulse is used to drive the grid of tube 42 in the positive direction after it traverses section 21, transferring current to tube 42. The trailing edge will reach the grid of tube 43 .6 microsecond later, driving it in the positive direction, restoring the current to tube 43, cutting off tube 42, and thereby producing a .6 microsecond pulse through transformer 49. If, however, a second signal pulse arrives at input 20 during the 1.2 microseconds traversal of the delay line sections 21, 22 by the first pulse, the negative leading edge will be coupled through diode 40 to the grid of tube 42, driving it negative to prevent subsequent conduction through tube 42 to produce the interrogate pulse, or stopping the pulse, if it has already started. Therefore, if a second pulse is received closer than 1.2 microseconds behind the first, either the first will be recorded in the proper channel or both will be blocked; i.e., not interrogated.

Occurrence of the interrogation pulse can also be prevented through diodes 47 or 50. Diode 50 permits gated operation of the analyzer. A switching arrangement is provided whereby two switches 51, 52 must be closed before the interrogate generator is rendered operative. The switches are connected in series between ground and the cathode of diode 50 through resistor 53, which is also coupled through resistor 54 to a source of negative voltage. A shunt resistor 55 by-passes switch 52. When both switches are closed, the cathode of diode 50 is substantially at ground, so the generator circuit will function at all times. If the gating switch 52 is opened, inserting resistor 55 in the circuit, the cathode of diode 50 is maintained at about −10 volts, so that a positive gate pulse of 10 volts is required at input 56 to permit subsequent transfer of current to tube 42 by the pulse at input 20. If switch 51 is opened the diode 50 is biased so far negative through resistors 53, 54 that no pulse will be recorded, even in the presence of input pulses at inputs 56, 20.

Interrogation is permitted only during a selected interval. Diode 47 is coupled between the grid of tube 42 and the plate of tube 35 of a timing multi-vibrator circuit. Tube 35 is normally conducting, but when a pulse is received at input 20, diode 37 conducts, dropping the voltage on the control grid of tube 35 below cutoff and transferring the current to tube 57. The voltage at the plate of tube 35 rises, just removing the hold-down bias from the grid of tube 42 through diode 47. During the period while tube 35 conducts, tube 42 is free to conduct upon receipt of a positive-going signal. The control grid of tube 35 is connected through resistor 58 and rheostat 59 to a source of positive potential, the rheostat being used to control the timing period of the multivibrator. A selected time interval after the current transfer, the grid voltage of tube 35 will rise and current will shift back to tube 35, dropping the potential at its plate and also at the grid of tube 42, thereby preventing an interrogate pulse. The plate of tube 57 derives its potential from a source coupled also to the plate of tube 42, so that the voltage applied across condenser 11 and resistors 58, 59 is determined by the potential at the plate of tube 42. Therefore, when current flows through the transformer 49 from tube 42, the voltage applied to the grid of tube 35 will drop, so that the grid will not climb back to cutoff potential and interfere with proper interrogation. The triggering signal on bus 39 will remain for 1 microsecond after the end of the pulse on bus 38, due to delay line sections 23, 24, so that a suitable time interval is provided for resetting of pulse lengthener tube 30 and the remainder of the pulse lengthener circuit, thus preventing a new pulse appearing within this 1 microsecond interval from triggering anew the multi-vibrator. Thus it will be seen that if input signal received at input 20 lasts too long, the multi-vibrator will have operated, the grid of tube 42 will be clamped negative again, and no current transfer to tube 42 can take place at the end of the pulse, so that no interrogation pulse will result.

Figure 3:
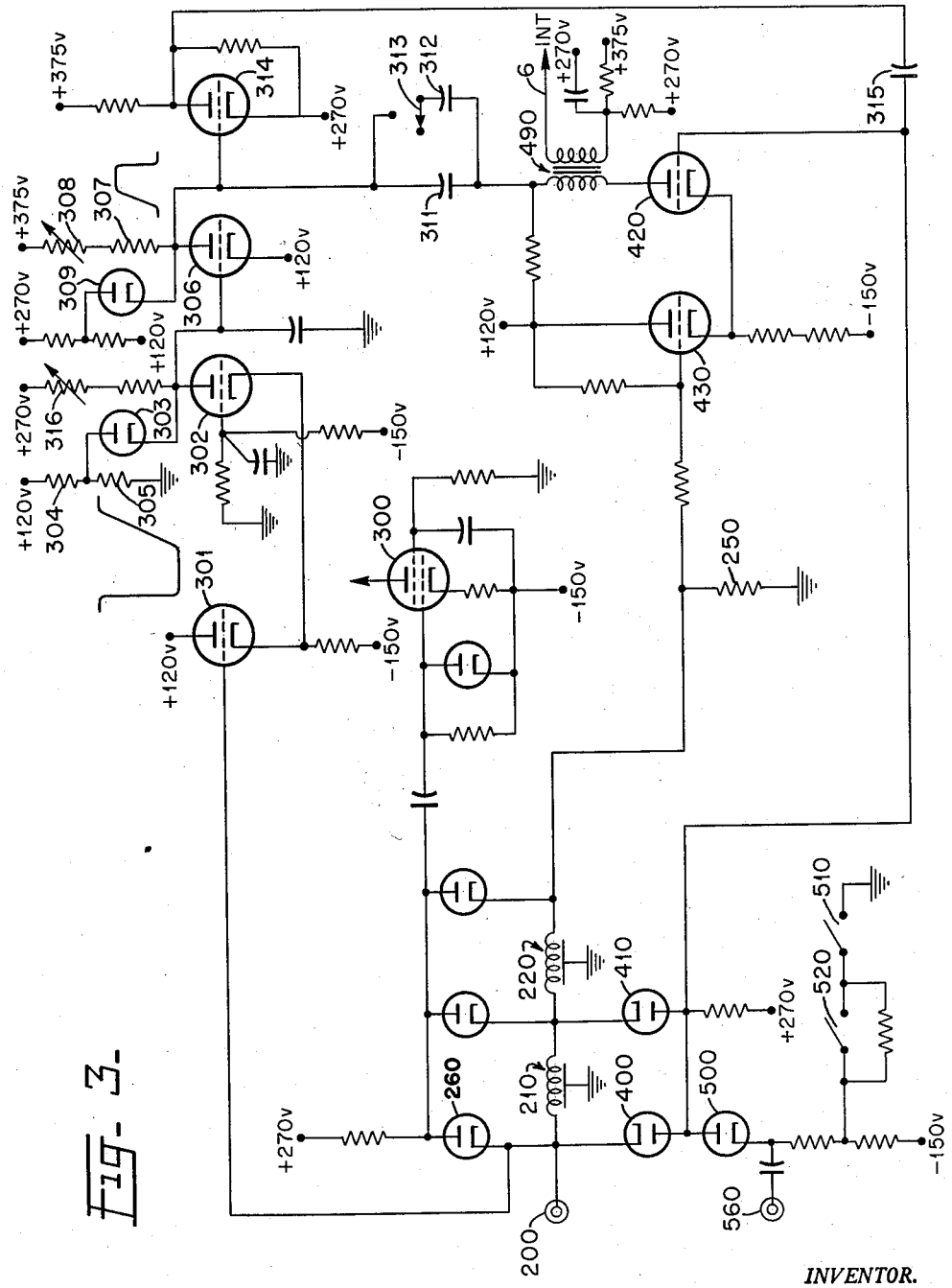
Figure 3 illustrates an alternative, preferred form of the interrogate pulse generator of Figure 2.

An alternative, preferred circuit arrangement for the interrogate generator is shown in Figure 3.

Referring now to Figure 3, negative pulses derived from the PHS circuit 10 are received at input 200 and impressed upon delay line 210, 220, comprising two .6 microsecond sections and terminated in its characteristic impedance 250. Tubes 430, 420 form a long-tailed pair, or switch, with tube 430 normally conducting and tube 420 normally cut off. Transformer 490 has its primary in the plate circuit of tube 420 and its secondary coupled to the interrogate bus. The negative input pulses from terminal 200 are also coupled through diode 260 to the input circuit of tube 300 in the pulse lengthener circuit, to render it non-conductive and block the discharge path of the lengthening capacitor, as described more fully in connection with Figure 4. When the trailing edge of the input pulse passes the junction between sections 210, 220, .6 microsecond after the end of the pulse of input 200, the grid of tube 420 will be driven in the positive direction through diode 410, shifting the current to that tube and starting current flow through the primary of transformer 490. Six-tenths microsecond later, after the pulse traverses line section 220, the positive-going trailing edge reaches the grid of tube 430, driving it in the positive direction, and transferring current back to that tube from tube 420. Thus a .6 microsecond pulse is produced in transformer 490 and impressed upon interrogate bus 6. But if a second negative pulse occurs at input 200 before completion of the interrogate pulse, it will be coupled to the grid of tube 420 through diode 400 to hold the grid down, thus blocking the interrogate pulse.

It is desirable to provide a constant dead time in the pulse analyzer so that the user may know exactly the time interval during which the machine is not receptive to pulses, thus enabling calculation of the percentage accuracy of his results. It is also highly desirable to prevent pulses of too long duration from entering the storage circuits, since generally they do not respresent accurately the amplitude of a single pulse but more often are formed by a group of pulses piling up at the input to the instrument. Negative pulses from input 200 are coupled to the grid of tube 301, which is cathode coupled to tube 302 to form a long-tailed pair. Tube 302 is normally cut off by a negative bias voltage, and its plate is held at about +120 volts through the grid current drawn by tube 306, while tube 301 is conducting. The negative pulse at the grid of tube 301 cuts off that tube, dropping the cathode potential and allowing tube 302 to conduct, producing at the plate of tube 302 the waveform illustrated above the number 301. Tube 306 is normally conducting through resistor 307 and variable resistor 308, its plate being held down at substantially +135 volts through diode 309. One or both of the timing condensers 311, 312, will be coupled between the plate of tube 306 and the primary of transformer 490 through switch 313. The negative pulse at the grid of tube 306 produces a positive waveform substantially as illustrated at the plate of tube 306, which is coupled to the grid of normally cut off tube 314.

The illustrated waveform shows how the grid voltage of tube 314 begins to rise when tube 306 is cut off and continues to rise until tube 314 draws grid current sufficient to stop the rise. The time constant of the network comprising variable resistor 308 and capacitors 311, 312, will determine the slope of the leading edge of the pulse applied to the grid of tube 314, thus determining how fast that voltage will rise, while the voltage at the junction of capacitor 311 and transformer 490 determines in part that grid voltage. If the control pulse is shorter than a selected value, tube 420 will conduct before the grid of tube 314 reaches conducting potential, dropping the grid voltage an additional amount and preventing conduction through tube 314. If, however, the control pulse is too long, tube 420 will be held cut off until after tube 314 begins to conduct, at which time a negative pulse is coupled through condenser 315 to keep tube 420 cut off. Therefore no interrogation pulse will be generated and the long pulse will not be stored.

The dead-time-adjust resistor 316 provides a known and variable insensitive time for the instrument by controlling the slope of the trailing edge of the negative pulse at the plate of tube 302. That slope determines the time required for the voltage at the grid of tube 306 to rise to the conducting potential, and thus determines the time of the end of the positive-going pulse at the grid of tube 314, and the time of return of tube 314 to the non-conducting state, with the consequent removal of the blocking pulse to tube 420.

Certain characteristics are desirable in a pulse lengthener circuit especially adapted for use in a pulse analyzer. For example, the lengthener must be fast in response, because the pulses received are generally very narrow in width. The lengthener must sense that a pulse has reached its peak and sustain that peak or crest amplitude for a finite period of time, during which time the amplitude must not trail off or diminish due to leakage. A conventional diode-condenser lengthener will not sustain the true crest amplitude, because of the lag in charging of the condenser due to the voltage drop in the diode. A feedback arrangement will substantially eliminate this voltage error, but will produce a large, fast drop in voltage across the lengthening condenser at the end of the pulse, due to the large feedback error signal and the capacity of the coupling diode. Applicant, however, has provided a novel circuit arrangement which permits use of a feedback loop, yet prevents the normally attendant erroneous results, in a manner described in connection with Figure 4.

Figure 4:
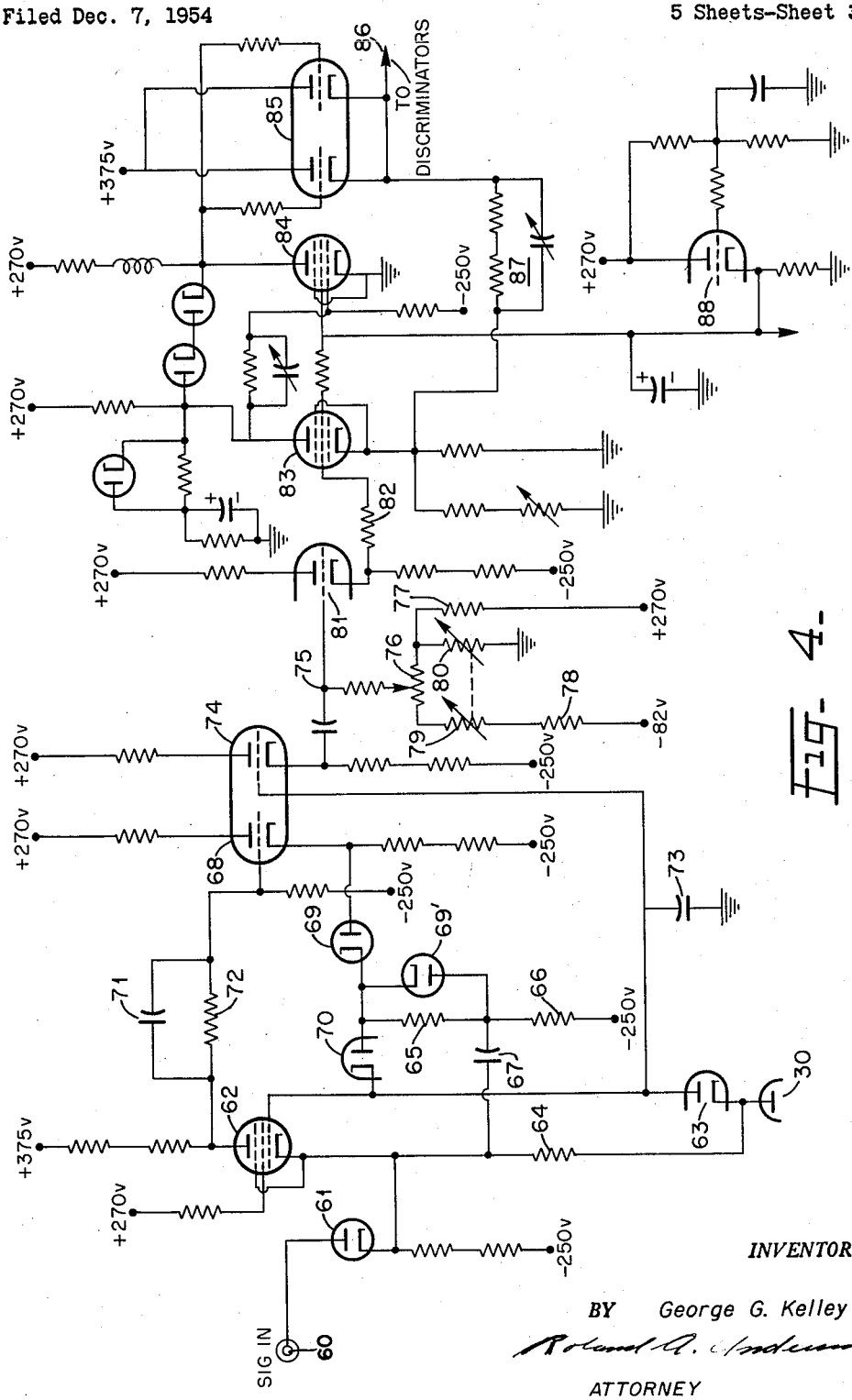
Figure 4 is a circuit diagram of the novel pulse lengthener and window amplifier incorporated in the novel analyzer.

Figure 4 illustrates a preferred form of a pulse lengthener and one of the window amplifiers connected thereto. An amplified signal pulse is applied through input 60 to a long-tailed pair including diode 61 and tube 62, the control grid of which is coupled to a lengthening condenser 73 and also to a diode 63. Resistor 64 and diode 63 are coupled to the plate of tube 30, Figure 2, and resistor 64 is coupled at the opposite end to the junction of resistors 65, 66 through capacitor 67. Tube 62 coupled to the grid of cathode follower 68 through resistor 72 and condenser 71, the cathode of tube 68 being coupled back to the control grid of tube 62 through feedback diodes 69, 70. Diode 70 is the high back-resistance-lengthening diode, preferably a vacuum diode type 6AL5. The large capacity-coupled surge across diode 70 at the end of a pulse is prevented by the circuit including protective diode 69', resistors 65, 66, and condenser 67. A negative bias voltage normally maintains diode 69' cut off. But the large negative surge at the cathodes of diodes 69, 69' causes diode 69' to conduct, transferring a negative pulse across condenser 67 to the cathode of tube 62, by passing diode 70 and condenser 73 except for a comparatively small back surge of 1 to 2 volts.

When no signal is present, lengthening is prevented by discharge of lengthening condenser 73 through diode 63 and tube 30. Diode 63 and resistor 64 prevent residual plate current through tube 30 from discharging lengthening condenser 73 during a signal. The diode cathode is held up at substantially the cathode potential of tube 62 when tube 30 is cutoff, while the diode plate is at the grid potential of tube 62, more negative than the cathode, so diode 63 is clamped open. The lengthened signal is coupled to the control grid of a cathode follower 74, and thence to the input 75 of the window amplifier.

In operation, current normally flows through tubes 30, 62 discharging condenser 73. Receipt of a positive pulse to be lengthened at input 60 is substantially coincident with receipt of a control signal at tube 30, cutting off that tube and blocking the discharge path for condenser 73. Upon receipt of a positive pulse at input 60, increased current flows through the cathode resistors, the common cathode potential is raised, and current shifts from tube 62 to diode 61, allowing the plate potential of tube 62 to rise. That potential rise is coupled to the grid of cathode-follower 68 and back through diodes 69, 70 to charge condenser 73 and to raise the grid potential of tube 62, thus limiting the rise of the plate potential. The grid potential of follower tube 74 is raised, thereby raising the voltage at point 75. As the pulse at input 60 subsides, the current shifts back from diode 61 to tube 62, lowering its plate voltage, and also lowering the grid voltage of tube 68. The cathode voltage of follower 68 drops, but shunt diode 69′ and condenser 67, being connected to a low impedance point, prevent a large drop at the junction of diodes 69, 70. The voltage change across diode 70 is of the order of a volt or less whereas the voltage change at the cathode of tube 68 may be greater than 100 volts. At the end of a pulse, tube 30 begins to conduct, discharging condenser 73, lowering the potential at the grid of follower 74 back to normal, and returning the tube 62 back to normal condition so that it may receive the next pulse. D.C. coupling between tubes 62, 68 maintains the proper static sharing of current between diode 61 and tube 62.

In the window amplifier, potentiometer 76 is coupled to input 75 and derives energizing potentials from a source of positive potential through resistor 77 and from a source of negative potential through resistors 78 and variable resistor 79, which is mechanically ganged to grounded variable resistor 80. The input is also coupled to the control grid of tube 81, which is a cathode follower direct-coupled through resistor 82 to the control grid of tube 83. Tube 83 is direct-coupled to the control grid of tube 84, the plate of which is coupled to cathode follower 85. The output pulse on lead 86 is delivered to the discriminator circuits of Figure 5, which may be similar to those known in the prior art. The output is also fed back to the cathode of tube 83 through a network 87. Tube 88 is a voltage regulating device designed to regulate the screen grid voltages for tubes 83, 84 and to provide a source of +120 volts for use elsewhere in the analyzer.

Figure 5:
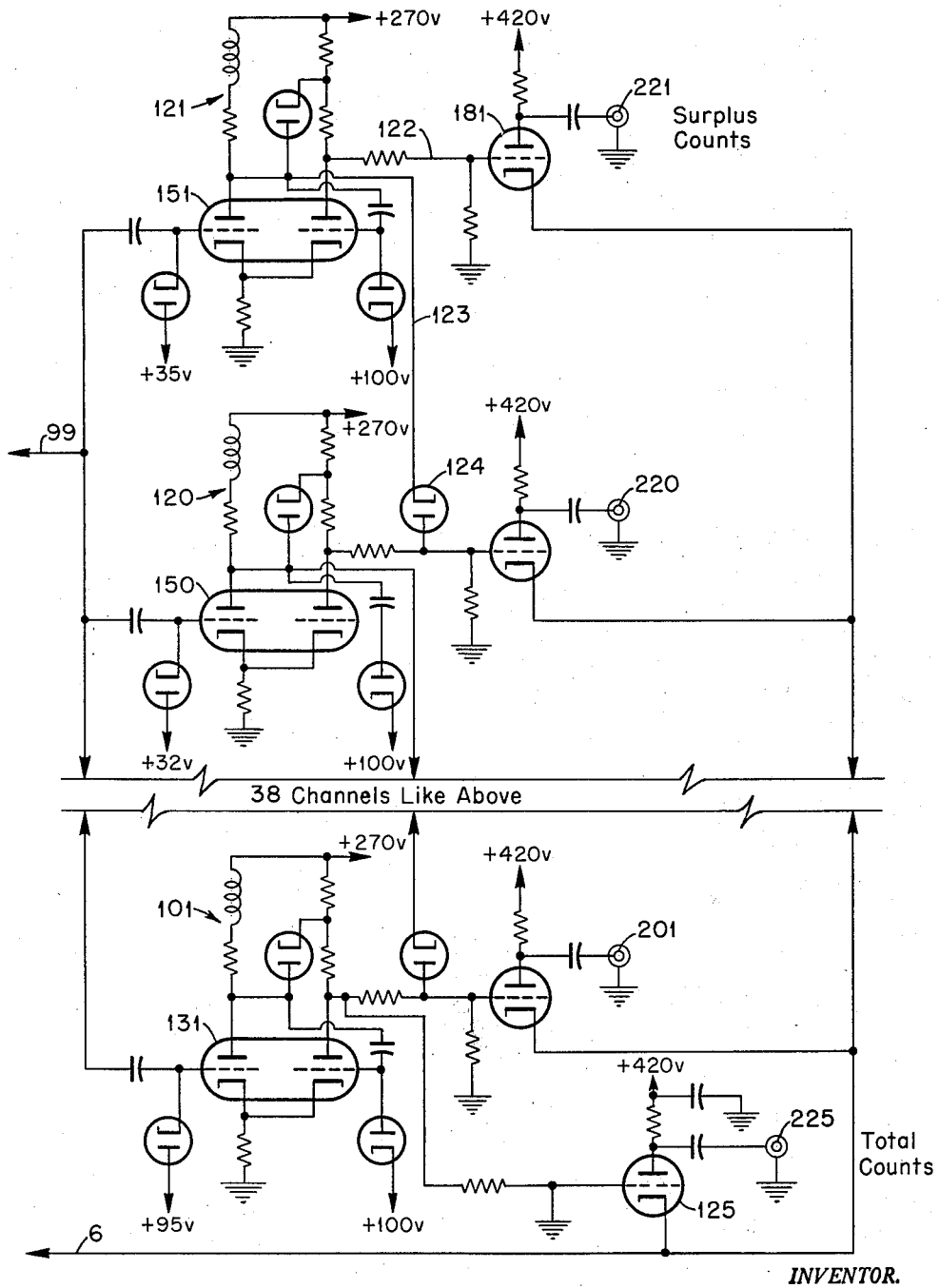
Figure 5 illustrates schematically the discriminators and scaler drivers incorporated in the novel analyzer shown in Figure 1.

Referring now to Figure 5, three discriminator channels of the one hundred twenty identical channels are illustrated in detail. Each channel comprises a conventional trigger circuit feeding a scaler driver tube. The lowest ordered discriminator channel 101 has its trigger circuit biased to trigger on receipt of a pulse of a selected amplitude, say 3 volts. Each successively higher ordered channel is then biased 3 volts more negative than the next lower ordered channel, in the conventional manner, through a diode coupled to the input grid of the trigger circuit. When a pulse is delivered to discriminators 7 on lead 99, all channels biased by a voltage less than the amplitude of the received pulse will be triggered, the trigger circuits producing a positive pulse and a negative pulse. In channel 121, for example, the positive pulse is produced on lead 122 with the negative pulse on lead 123. The negative pulse in each channel is coupled through a diode to the positive pulse output of the next lowest order channel to cancel it by anti-coincidence action. For example, diode 124 couples channels 120 and 121. Therefore, only the highest order channel that is triggered will deliver a positive pulse output to its associated scaler driver tube. The "interrogator" pulse from lead 6 is applied to the cathodes of all scaler driver tubes simultaneously. The latter tubes are so biased that they will not conduct unless they receive both a positive trigger pulse on their control grids and a negative "interrogator" pulse on their cathodes at the same time. When a tube conducts momentarily, it produces a negative pulse in its plate circuit. Such pulses are coupled to corresponding scalers through output terminals 220—225.

A separate driver tube 125 is coupled to the trigger circuit in the lowest ordered channel 101 to receive a pulse for each count received on lead 99 coincident with the "interrogator" pulse on lead 6. This driver actuates a scaler through output 225 so that the scaler provides an indication of the total count received.

The pulse counters provided may be scaling circuits of conventional design with associated mechanical counters, the Higginbotham-type circuit being preferred. A separate scaler is coupled to the output of each driver tube to record the number of pulses producing an output from the scaler driver of each channel.

Figure 6:
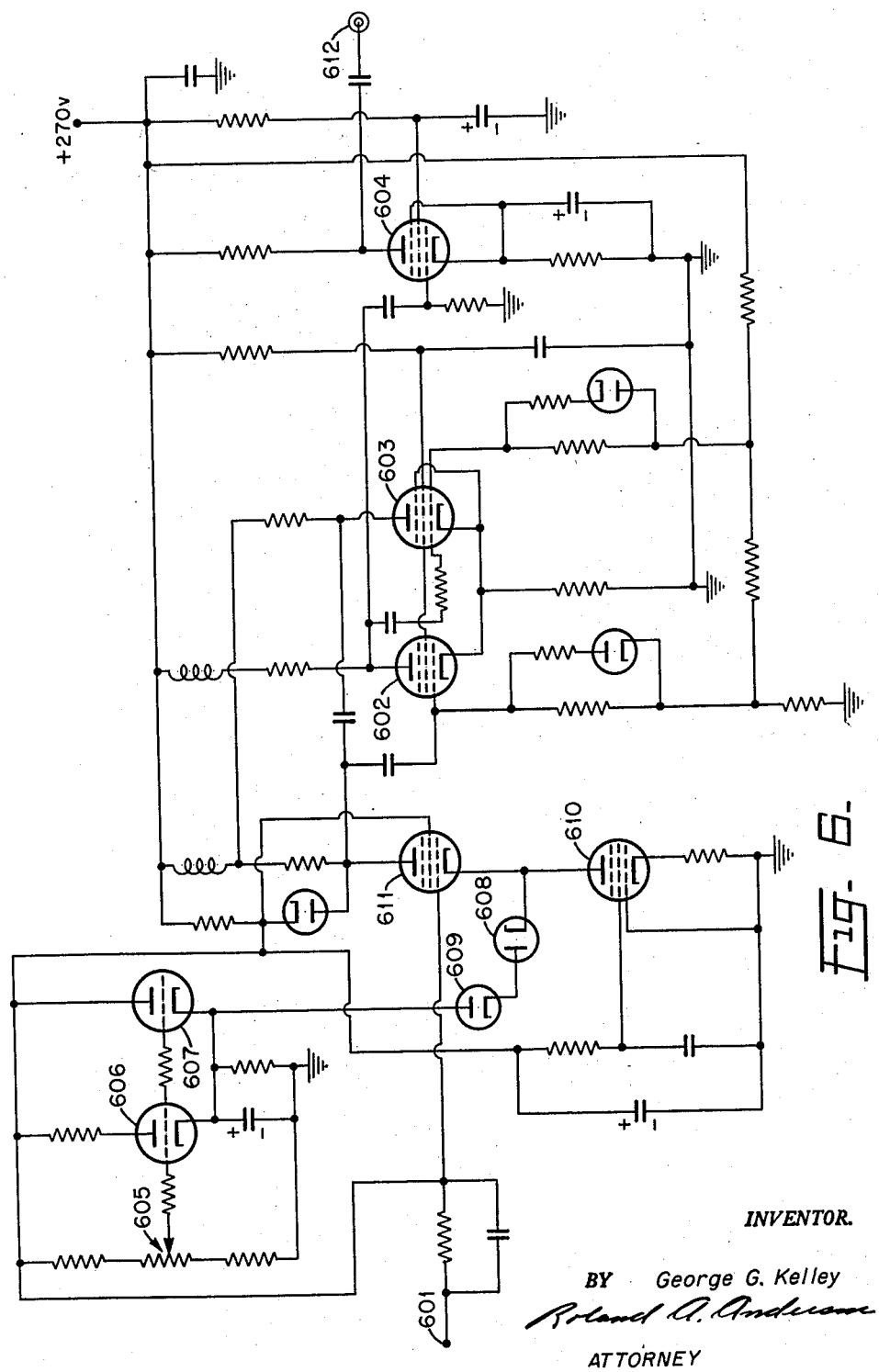
Figure 6 is a schematic diagram of the pulse height selector (PHS) coupled to the linear amplifier.

Referring now to Figure 6, a preferred form of pulse-height-selector circuit may comprise input 601, a long-tailed pair biased to refuse pulses below a selected level, a trigger circuit, and an output stage. Normally a constant current flows through tube 610 and divides through diodes 608, 609 and tubes 611 of the long-tailed pair. The setting of potentiometer 605 determines the current flow through regulator tubes 606, 607 and thus sets the cathode potential of tube 611. A positive pulse from input 601 produces a corresponding negative pulse at tube 611, which pulse is coupled to tube 602. If the input pulse is greater than a selected magnitude, tube 602 will be cut off and tube 603 will conduct. At the end of the input pulse, the positive-going voltage at the plate of tube 611 will cause tube 602 to conduct, cutting off tube 603, and ending the trigger pulse. That pulse is amplified and inverted in tube 604 and delivered to output 612.

Thus it may be seen by those skilled in the art that applicant has provided for the first time a novel pulse height analyzer arrangement suitable for inspection of the entire pulse spectrum simultaneously, which analyzer is provided with novel inter-connections and electronic circuit arrangements which minimize the complexity and number of components required without sacrificing accuracy of speed, and which provide for effective rejection of any but those pulses which are amenable to accurate sorting.

Having described the invention, applicant claims:

1. A multi-channel analyzer for determining the amplitude distribution of a series of signal pulses comprising: a linear amplifier provided with an input for receiving said pulses and an output for delivering amplified pulses; means connected to said amplifier output for deriving from said amplified pulses uniform amplitude control pulses of duration proportional to that of the respective amplified pulses; lengthener circuit means connected to said amplifier output for sustaining the crest amplitudes of said amplified pulses; a plurality of amplitude selective amplifiers, each responsive only to signals above a selected amplitude and each having an input connected to said crest-sustaining means; a plurality of groups of parallel-connected amplitude discriminators, each group being coupled to the output of a corresponding amplitude selective amplifier, the discriminators in each group being biased successively to different levels within a selected voltage range to form a group of pulse channels; means for counting the pulses occurring in each channel; and means for blocking the path of said amplified pulses responsive both to receipt of more than one signal pulse within a selected interval and to receipt of a signal pulse of greater than a selected duration.

2. The analyzer of claim 1 wherein said means for blocking the path of said amplified pulses comprises: a delay line terminated in its characteristic impedance coupled to receive said control pulses and provided with a plurality of taps therealong; means coupled to a first group of said taps for enabling said lengthener circuit means for a selected time interval; a monostable timing multi-vibrator circuit; a switching circuit comprising first and second cathode coupled electron tubes, each provided with cathode, grid, and plate electrodes; means for coupling the grid of a first tube to said first and second delay line taps and to said timing multi-vibrator; means for coupling the grid of said other tube to the third tap, whereby said switch will be actuated only after said control pulse both reaches said third tap and leaves said second tap; means actuated by said switch for unblocking said discriminators; and a diode gate comprising a diode having one element coupled to said first, second, and third taps and a second element coupled to fourth and fifth taps and said multivibrator, and a source of potential coupled to said diode and said fourth and fifth taps, said gate delaying of reset action of said multivibrator until said control pulse passes said fifth tap thereby delaying resetting of said switch and consequent discriminator blocking for a selected period.

3. The analyzer of claim 1 wherein said lengthener circuit includes a lengthening condenser and said means for blocking the path of said amplified pulses comprises: a multi-segment delay line provided with a plurality of taps including an input tap coupled to receive said control pulses; a first gating tube coupled to said lengthening condenser in said pulse lengthener to form a discharge path therefor; means coupling a first group of said taps to said gating tube to cut off the same, thereby enabling said lengthener; a diode network coupled to each of said taps for deriving a control voltage for a selected time interval after receipt of each pulse; a switching circuit comprising first and second cathode-coupled tubes, each provided with anode, grid, and cathode electrodes, means for biasing the first of said tubes so that said first tube will draw current, but said second tube will not conduct; a timing multi-vibrator having an input coupled to said diode network to receive said control voltage; means coupling said first two taps to the grid of said second tube; means coupling the third of said taps to the grid of said first tube whereby a positive voltage excursion at said input tap allows current to be drawn through said first tube until said positive excursion reaches said third tap, said first tube being prevented from conducting even in the presence of said positive excursion by relaxation of said multi-vibrator after its selected timing interval; means for deriving an enabling signal for said counting means from current flow through said first tube; and means coupling said first tap to the grid of said first tube to prevent conduction therethrough in the event a second negative pulse is received at said first tap before said switch has operated.

4. In a pulse amplitude analyzer of the character described, an interrogate generator for generating a gating pulse responsive to receipt of no more than one control pulse of shorter than a selected duration within a selected time interval comprising: a delay line provided with input, intermediate, and end taps and terminated in its characteristic impedance coupled to receive said pulses; a switching circuit having two states and provided with two inputs and an output; a source of current coupled to said switch output, whereby actuation of said switch from one state to the other and back to the first state generates said gating pulse; means coupling said control pulses from said intermediate tap to a first switch input to actuate said switch when the end of a control pulse reaches said tap; means coupling said control pulses from said end tap to a second switch input to reset said switch after suitable delay; means coupling said control pulses from said input tap to said first switch input to prevent switch actuation upon receipt of a second control pulse within a selected interval; a timing network for deriving from said control pulse a timing pulse of duration corresponding to said control pulse, adjustable means in said network for selecting the decay time of said timing pulse; and a blocking tube having an input coupled to receive said timing pulse and an output coupled to said second switch input to prevent switch actuation during a selected portion of said timing pulse.

References Cited in the file of this patent
UNITED STATES PATENTS

| | | |
|---|---|---|
| 2,449,819 | Purington | Sept. 21, 1948 |
| 2,462,111 | Levy | Feb. 22, 1949 |
| 2,636,983 | Poole | Apr. 28, 1953 |
| 2,642,527 | Kelley | June 16, 1953 |
| 2,643,369 | Manley | June 23, 1953 |
| 2,679,586 | Holland | May 25, 1954 |
| 2,694,146 | Fairstein | Nov. 9, 1954 |
| 2,707,751 | Hance | May 3, 1955 |
| 2,775,698 | Bell et al. | Dec. 25, 1956 |
| 2,801,281 | Oliver et al. | July 30, 1957 |